No. 109,183.                                                      PATENTED NOV. 15, 1870.
R. CREUZBAUR.
STEAM TILLER.

3 SHEETS—SHEET 2.

Witnesses:                                                        Inventor

No. 109,183.

R. CREUZBAUR.
STEAM TILLER.

PATENTED NOV. 15, 1870.

3 SHEETS—SHEET 3.

Witnesses.

Inventor

United States Patent Office.

ROBERT CREUZBAUR, OF WILLIAMSBURG, NEW YORK.

Letters Patent No. 109,183, dated November 15, 1870.

IMPROVEMENT IN STEAM-TILLERS.

The Schedule referred to in these Letters Patent and making part of the same.

*To all whom it may concern:*

Be it known that I, ROBERT CREUZBAUR, of Williamsburg, in the county of Kings and State of New York, have invented certain new and useful Improvements in Steam-Tillers; and I do hereby declare that the following is a full, clear, and exact description thereof, reference being had to the accompanying drawing making a part of this specification, in which—

Figure 1:
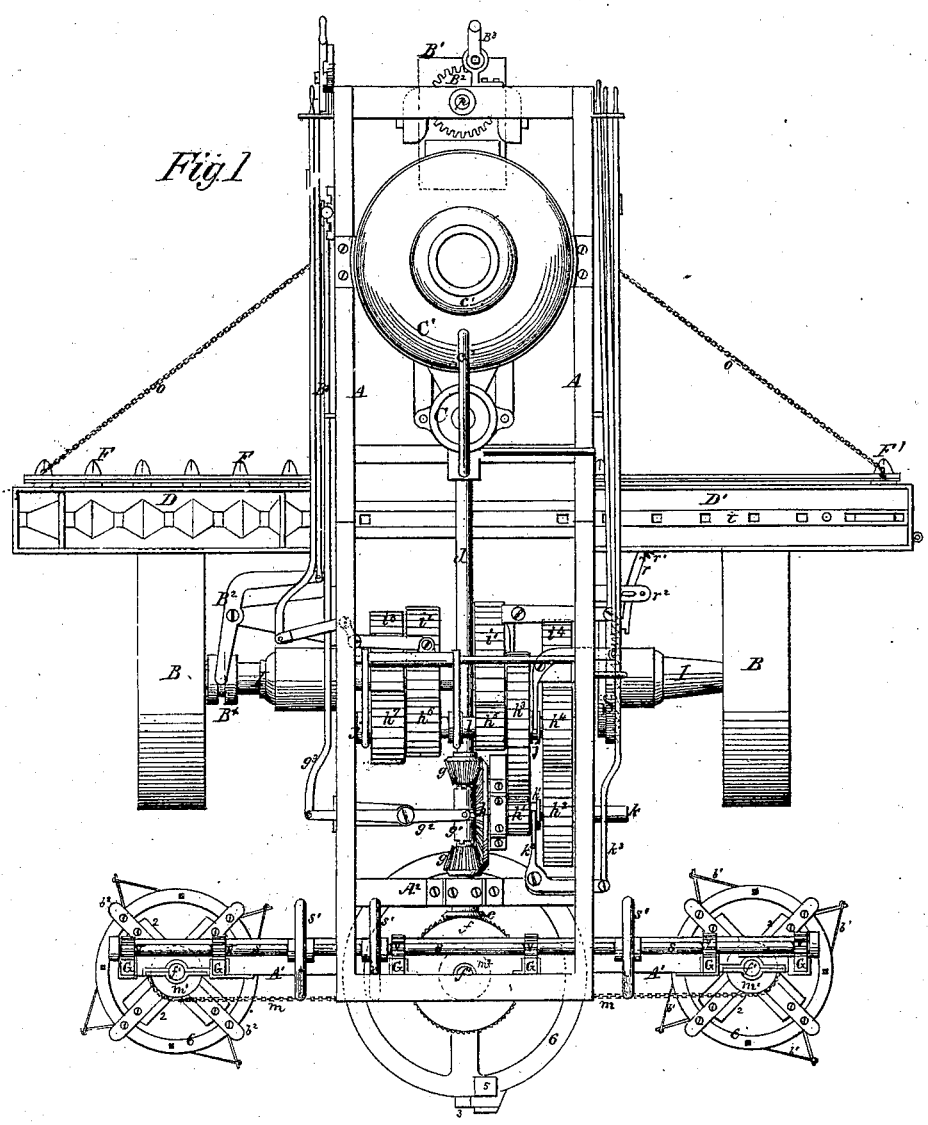

Figure 1, plate 1, is a plan of the improved tiller, with seeding devices attached.

Figure 2:
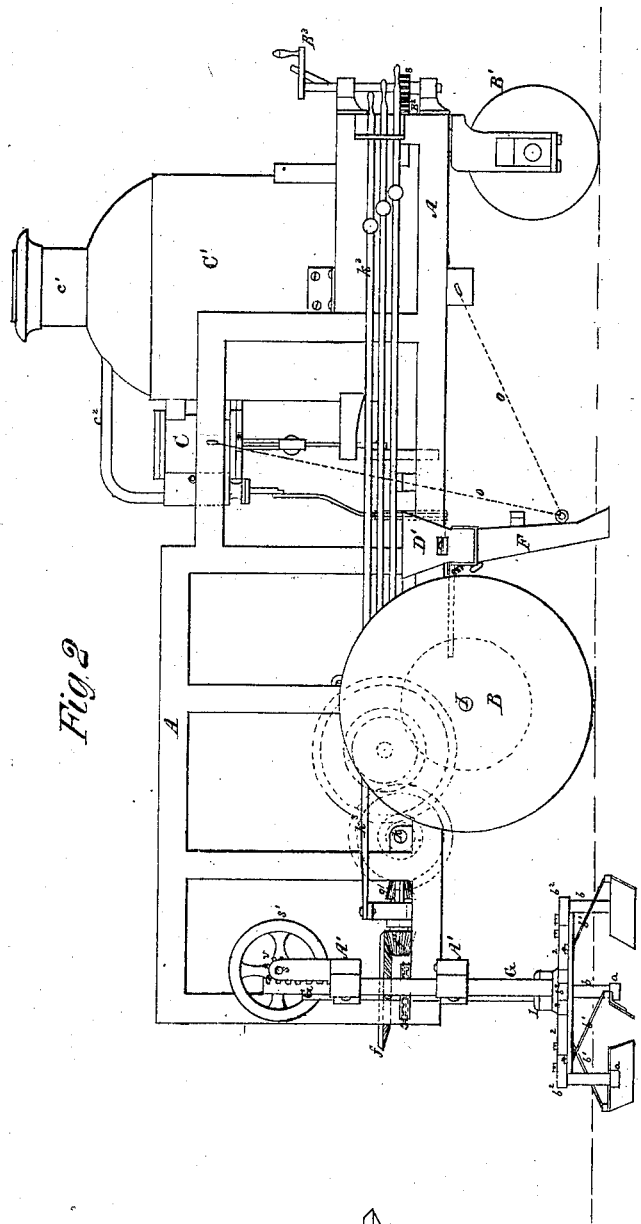

Figure 2, plate 2, is an elevation of one side of the tiller.

Figure 3:
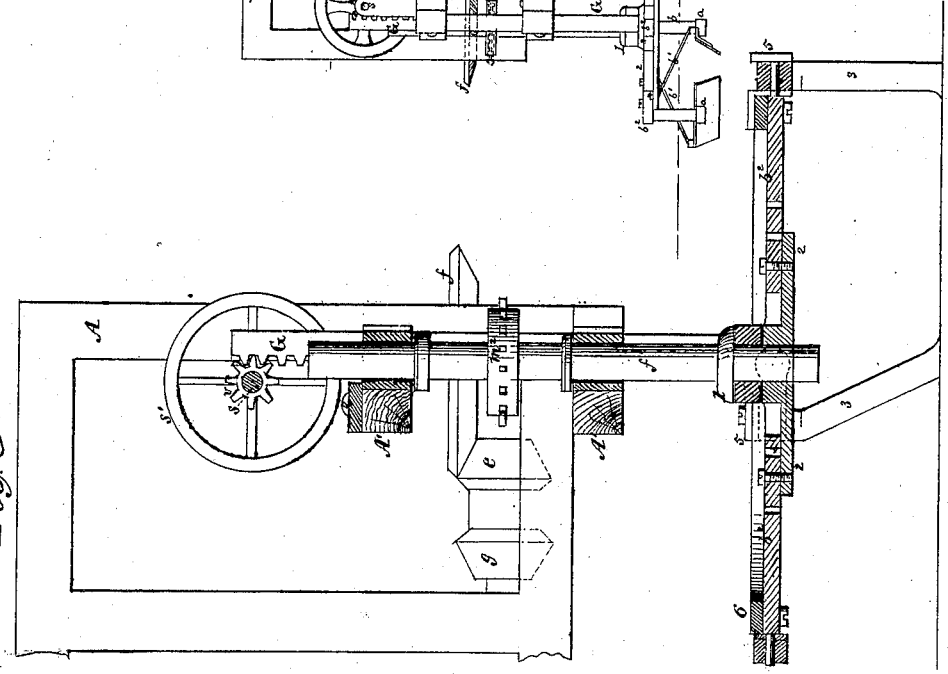

Figure 3, plate 2, is a sectional elevation illustrating the manner of applying the cultivator-frames to the traveling carriage.

Figure 4:
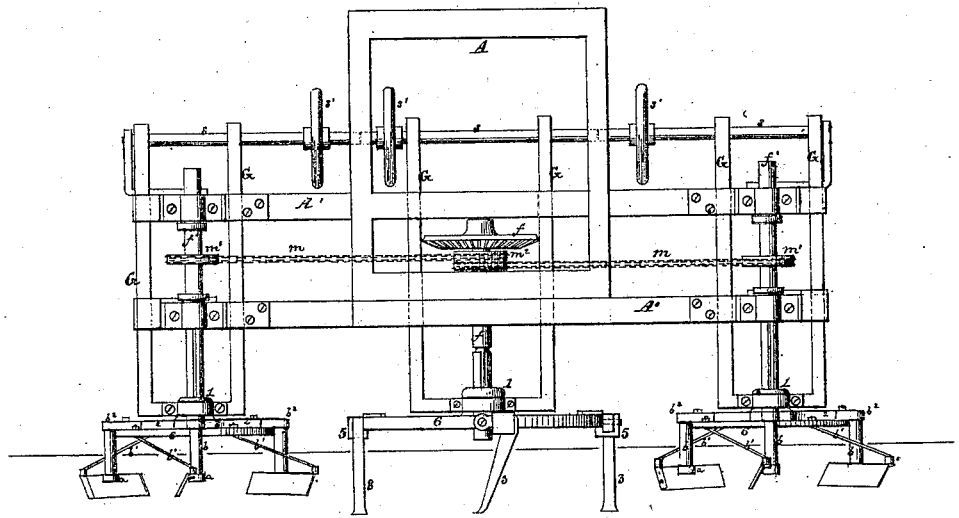

Figure 4, plate 3, is a rear elevation of the traveling carriage, having three revolving cultivator-frames attached.

Figure 5:
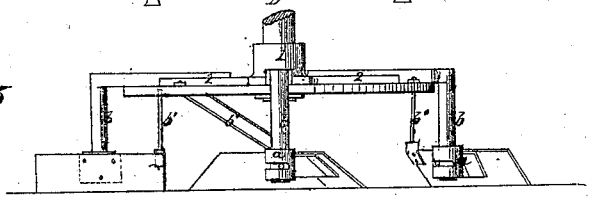
Figure 6:
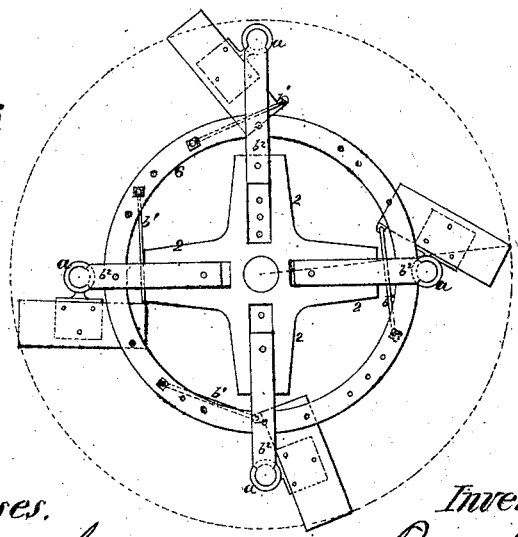

Figures 5 and 6 are, respectively, side and plan views of a mode of applying adjustable shovels or scrapers to the revolving frames.

Similar letters of reference indicate corresponding parts in the several figures.

This invention relates to certain novel improvements which are applied to a carriage propelled by steam or other motive power, and designed for tilling the soil, for the cultivation of crops, the distribution of seeds, and for other agricultural purposes.

The nature of my invention consists, mainly, in the application to a traveling carriage which is moved by steam or other motive power of one or more rotating frames, which are arranged to rotate horizontally and to carry a number of plows, colters, shovels, or scarifying-blades of any kind, according to the kind of work to be performed, said frame or frames being vertically adjustable and supported and guided in a substantial manner, so that they can be raised or depressed either while in motion or at rest, and sustained at any desired point, according to the depth at which it is desired to stir the soil; said frame or frames being also driven through the medium of gearing from the main shaft, which also communicates motion to the driving-wheel of the carriage, thereby preserving a certain relative speed between the forward movements of the carriage and the rotary movements of the frames.

It also consists in providing for varying the speed of the carriage of the tiller-frames according to the resistance to be overcome, without varying the speed of the engine strokes and tools; and also in providing for guiding, for stopping or starting, and for reversing, the movements of the machine at the pleasure of the attendant.

It also consists in providing for adjusting the soil, tilling, and cleaning tools used in the cultivation of growing plants, in such manner that spaces between the tools of two or more revolving frames can be left for the safe passage between these frames of the rows of plants.

It also consists in a mode of combining seed-distributing devices with horizontally-rotating soil-tilling instruments, and steam or other motor-engine.

The following description will enable others skilled in the art to understand and carry into effect my improvements.

In the accompanying drawing—

A represents the carriage-frame supported by two wheels, B B, and in front by a caster or guide-wheel, $B^1$. The wheel $B^1$ has a spring interposed between its yoke and carriage-frame, or between the journal-boxes of its axle and the yoke, for relieving the machinery upon the carriage-frame from injurious jar and concussion.

The side wheels B B are mounted on their axle I so as to admit of either one being disengaged therefrom when it is desired to turn the carriage short around. A sliding clutch, $B^x$, or other like contrivance, controlled by a lever, $B^2$, and draw-rod, may be used for this purpose.

C is the cylinder of the engine, for giving motion to the machine, and $C^1$ is an upright boiler, which supplies steam to the cylinder C through the pipe $c^2$.

$d$ is the main driving-shaft, which extends longitudinally through the center of the carriage, and carries on its rear end a beveled-pinion spur-wheel, $e$, which engages with a horizontal beveled wheel, $f$, keyed to an upright shaft, $f'$, and serves to drive that shaft.

The shaft $f'$ extends down below the carriage-frame A, and is connected to the hub of a revolving colter-carrying frame.

In the drawing, figs. 1 and 4, the machine is represented as having applied to it three rotary cultivator-frames, the central one of which has cultivator-teeth applied to it, and the two outside frames have scrapers or shovels applied to them. In practice, one, two, three, or any desired number of these cultivator-frames may be employed, provided with the same kind of tilling instruments or with different kinds of these instruments.

Each cultivator-frame consists of a boss, 1, having four radial arms, 2, which are braced by means of a concentric ring, 6. The frame thus formed carries four colters, 3, or four shovels or scrapers, or other instruments suitably adapted to the requirements of the case. If colters 3 are used, they are pivoted to the ends of adjustable regulating arms $b^2$, (see fig. 3,) and rest in stirrups 5, to which they are fastened, at the angles or elbows, by wooden pins.

When either of the colters 3 meets with an obstruction which would be liable to break or derange the machinery, it is intended that its wooden pin shall break, and allow the colter thus obstructed to fall back and pass over the obstruction.

The stirrups 5, to which the colters are pivoted, are secured firmly to the ring-brace 6, and project beyond its circumference, as shown in the drawing.

For agricultural purposes, such as plowing up or loosening the soil, the colters may be from two to four inches wide and from twelve to eighteen inches long, and they are intended to cut and loosen the earth by rotating horizontally about the axis of their respective shafts $f'$, and their outer edges are advanced sharp angles, which cut the earth and draw it inwardly or toward the center.

For the cultivation of growing crops shares and scrapers are used instead of the colters, which, unlike the colters, cut in their rear sweep as well as in front; that is to say, the colters, in coming around in the rear, meet loose earth cut by the front sweep, while the scrapers find work to do in their rear sweep which was not finished during their front sweep.

The manner of arranging scrapers upon the revolving frames is shown in figs. 5 and 6. The sockets $a$, to which the shares are riveted, are secured to the perpendicular shanks $b$ by bayonet fastenings, the pins or knobs being on the shanks $b$ and the slots being in the sockets $a$.

To prevent the shares from turning and working loose from their respective shanks $b$, regulating brace-rods $b'$ are provided, which are secured at one end to the ring 6, by means of nuts, while their other ends are received and held in sockets formed for them on the upper angles of the shares.

By having a number of holes in the ring 6 to receive the upper ends of the rods $b'$, the shares can be adjusted and set in different positions for throwing more or less earth up to or from the rows of plants under cultivation.

The frame by which the tools are carried can be constructed in various ways. For instance, it may be simply a disk of sheet-iron fastened to a suitable hub, to the periphery of which sockets to receive the tool-shanks could be screwed. Such a disk could be lightened by cutting out part of the same. Or a system of truss-work could be applied. In fact, the construction of the frame should be in harmony with the work to be done. In light work, such as cultivating crops, seeding, &c., great rigidity is unnecessary, and all bracing might be dispensed with.

The two vertical shafts $f' f'$, which are arranged outside of the frame A, are applied to journal-boxes which are secured to lateral extensions A' A' of the main frame.

Each one of the three shafts $f'$ is so applied to its bearings that while it will receive free rotary motion about its axis, it is prevented from receiving vertical motion by means of collars applied to it above and below its bearings.

The cultivator-frame of each shaft $f'$ is applied thereto by means of a key-tenon in the shaft receiving a feather on the hub of said frame, thus allowing the frame to be adjusted up or down on its shaft, whether the latter be rotating or at rest.

Each cultivator-frame is supported and adjusted up and down by means of racks G G, which pass through guides and engage with pinion spur-wheels U U, which are keyed on a hand-wheel shaft, $s$, arranged and suitably sustained above the frame A'.

Each one of the cultivator-frames is provided with a separate hand-wheel shaft, $s$, carrying a hand-wheel, $s'$, so that these frames can be raised or depressed independently of one another.

The two outside cultivator-frames are rotated by means of chain-belts $m$ $m$, which pass around a spurred or studded pulley, $m^2$, on the intermediate shaft $f$, and also around a studded pulley $m^1 m^1$, on the two outer shafts $f' f'$. If desirable, the belts $m$ $m$ may be crossed, so as to rotate the cultivator-frames in opposite directions. In cultivating rows of plants, each one of the horizontally-rotating cultivator-frames cultivates one row, the machine acting upon three rows at a time.

The arms $b^2$, carrying the cultivator-instruments, being radially adjustable, it is obvious that these instruments can be adjusted in such manner that in the cultivation of crops the growing plants or the seed-rows can pass between the instruments uninjured.

This radial adjustment is effected by having a number of holes through the arms 2 2, to receive the pins or bolts that connect the arms $b^2$ to them.

The wheels B B, which carry the machine, are driven by the same engine, and through the medium of the same shaft $d$, which communicates motion to the rotary cultivator-frames. The machine must, therefore, have the capacity to vary its speed according to the work to be done and the amount of resistance offered. This is accomplished in the following manner:

The main shaft $d$ has two loose bevel-wheels $g$ $g$ on it, near its rear end, which gear into and alternately drive, through the medium of a clutch, $g^1$, the bevel-wheel $h$, which latter is mounted on a short transverse shaft, $k$.

The clutch $g^1$ is connected to an operating-rod, $g^3$, by means of a lever, $g^2$, (see fig. 1.) With the clutch $g^1$ in a central position, the transporting-wheels B B do not revolve, and the machine stands still; but with this clutch moved forward or backward, the machine will advance or recede.

The short transverse shaft $k$, which carries the bevel-wheel $h$, has keyed on it a spur-pinion, $h^1$, and a larger spur-wheel, $h^2$. The pinion $h^1$ engages with the teeth of a large spur-wheel, $h^3$, which is mounted on a transverse shaft, $l$, and the wheel $h^2$ engages with and drives the pinion $h^4$, also on the shaft $l$. This shaft also carries three other pinions, $h^5$, $h^6$, $h^7$.

These four pinions last referred to, respectively gear into the wheels $i^1$, $i^2$, $i^3$, and $i^4$, which are keyed on the main axle I of wheels B B, and this arrangement is designed to give eight different rates of speed to the transporting-wheels B B.

The pinions $h^4$, $h^5$, $h^6$, and $h^7$ are provided with clutching devices $j$, controlled by operating-rods and levers, for making them fast on their shaft $l$ when it is desired to bring any one of them into action for driving the main axle. When the clutches $j$ are all disengaged from their wheels on the shaft $l$, the machine will remain stationary, notwithstanding the shaft $l$ may be rotated.

On one side of the frame A, and keyed on the main axle I, is a tappet-wheel, S, which gives intermittent vibrating movements to a short lever, $r$, which has its fulcrum at $r^2$, on frame A, and which is held against the teeth of wheel S by means of a spring, $r^1$, shown in fig. 1. This lever $r$ is connected by a pivot to a horizontally transversely-arranged seed-slide, $t$, which is applied at the bottoms of the seed-hoppers D D'. These hoppers in practice may be adapted for sowing seed either in drills, as from the hopper D, or broadcast, as from the hopper D'.

Each hopper is sustained and braced by means of the frame A and chains O O, and each hopper is provided with check-row markers or drill-teeth F. Each hopper will also be provided with devices for regulating the flow of the seed from it.

Second, for scraping the surface of the land in cleaning crops, and when the soil is light and in good order, the frames may be disengaged from the driving-power, so that the scrapers, being set to cover the whole breadth of the land, will do the work in the direction of the advance of the machine without revolving around the shaft $f'$ for the time thus used, although arranged upon such shafts, and to revolve when thrown in gear with the driving-power.

Having described my invention,

What I claim as new, and desire to secure by Letters Patent, is—

1. The frame 2, constructed and arranged to revolve rigidly with the tools, at a constant angle with its shaft $f'$, substantially as and for the purpose described.

2. The sliding-head 1, in combination with the shaft $f'$ and frame 2, substantially as and for the purpose described.

3. The shaft $f'$ and arms G, arranged with the frame carrying the tilling tools, for vertical adjustment without changing the angle of the tilling-tools and frame with respect to the shaft $f'$, substantially as described.

4. The combination of one or more frames, each constructed to operate rigidly with its tools in a horizontal direction, at a constant angle with its shaft $f'$, with the mechanism for regulating the depth of the entrance of the tools into the soil, substantially as and for the purpose described.

5. The combination of the horizontally-rotating frame, carrying tilling or crop-cultivating tools, with one or more speed-varying gears or mechanisms, operating upon the relative speed of the carriage, and devices for adjusting said gears or mechanism, substantially as and for the purpose described.

6. Laterally or radially adjustable land-tilling or crop-cultivating tools, applied to a horizontally-rotating frame, substantially as described.

7. The adjustment of a set of cultivating-tools or scrapers around their own pivots or shanks $g$, independent of the adjustment of their carrying-frames, substantially as and for the purpose hereinbefore set forth.

8. In a steam or other analogous land-tiller, the arrangement of horizontally-rotating frames carrying tilling-tools, with seed-distributing devices, substantially as herein described.

9. The combination of the horizontally-rotating frame or frames, carrying land-tilling or crop-cultivating tools, with the transporting wheels of the carriage, by means of a system of driving and controlling mechanism, whether the said system be for giving a uniform or both a uniform and varying speed, substantially as herein described.

10. The arrangement of two or more horizontally rotating frames, carrying tilling or cultivating-tools, operated simultaneously, and at the same time are separately adjustable up or down without being thrown out of gear, substantially as described.

ROBERT CREUZBAUR.

Witnesses:
 ISAAC S. WATERS,
 J. W. KIRK.